May 3, 1966

H. A. STEINBRUEGGE ETAL 3,249,846
ELECTRICAL APPARATUS FOR INITIAL AND SHORT CIRCUIT
EXCITATION OF GENERATORS
Filed Feb. 25, 1963

WITNESSES
Theodore F. Wrobel
Donald R. Lackey

INVENTORS
Harold A. Steinbruegge
Ralph A. Geiselman
BY
F. E. Browder
ATTORNEY

United States Patent Office 3,249,846
Patented May 3, 1966

3,249,846
ELECTRICAL APPARATUS FOR INITIAL AND SHORT CIRCUIT EXCITATION OF GENERATORS
Harold A. Steinbruegge, Edgewood, and Ralph A. Geiselman, Forest Hills, Pa., assignors to Westinghouse Electric Corporation, Pittsburgh, Pa., a corporation of Pennsylvania
Filed Feb. 25, 1963, Ser. No. 260,770
6 Claims. (Cl. 322—28)

This invention relates in general to control apparatus and more particularly to excitation systems.

It is sometimes desirable that the electric power for regulator and excitation circuits be derived from the output voltage of the dynamoelectric machine being regulated. Problems related to these self-excitation systems for dynamoelectric machines involve initial excitation and short circuit excitation systems.

In providing initial excitation for self-excited dynamoelectric machines, an independent source of voltage may be used. The problem arises in properly coordinating the momentary auxiliary field excitation or flashing of the field circuit, and the disconnecting of the independent voltage source when the output voltage of the dynamoelectric machine has built up to the desired value. Prior art arrangements for accomplishing the desired coordination usually require mechanical switching devices, which are subjected to wear and periodic maintenance.

It is, therefore, desirable that an excitation initiation system be provided that uses all static components and is completely automatic in operation.

Short circuit excitation is a problem when self-excitation systems are used because when the output of the dynamoelectric machine is shorted, the output voltage and hence the power to the regulating and excitation systems falls to zero. Field excitation should be maintained after the short circuit until all protective relays can be energized and the necessary circuit breakers operated to disconnect the machine from the short circuit.

It is, therefore, desirable that a short circuit excitation system using all static components be provided that will automatically maintain the excitation of the dynamoelectric machine in the event the output of the dynamoelectric machine becomes short circuited.

Accordingly, it is a general object of this invention to provide a new and improved excitation initiation system for self-excited dynamoelectric machines that is completely automatic in operation.

Another object of this invention is to provide a new and improved excitation initiation system for self-excited dynamoelectric machines that uses all static components.

A further object of this invention is to provide a new and improved short circuit excitation system for self-excited dynamoelectric machines that will automatically maintain excitation voltage in the event the output of the dynamoelectric machine is short circuited.

Still another object of this invention is to provide a new and improved short circuit excitation system for self-excited dynamoelectric machines that uses all static components.

Briefly, the present invention accomplishes the above cited objects concerning excitation initiation systems by utilizing the switching characteristics of solid state controlled rectifiers. More specifically, the controlled rectifier automatically connects a voltage source to the field winding upon starting the generator and automatically disconnects the voltage source when the generator output voltage has built up to a predetermined value.

The invention accomplishes the cited objects concerning short circuit excitation by utilizing the switching characteristics of solid state controlled rectifiers and the reverse voltage breakdown characteristics of Zener type diodes or rectifiers. More specifically, a current transformer is used to develop a voltage proportional to the generator line current. When the generator line current reaches short circuit proportions, the voltage produced by the circuit becomes high enough to cause the Zener diode to breakdown and conduct in its reverse direction, applying a current pulse to the gate electrode of the controlled rectifier. The controlled rectifier, which is connected in a series circuit relationship with a voltage source and the field winding, then allows current conduction and connects the voltage source to the field winding, providing excitation voltage to actuate the necessary relays and circuit breakers.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1:
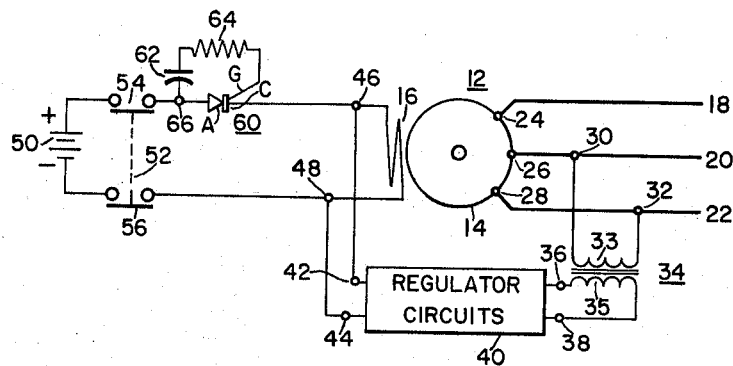
FIGURE 1 is a schematic diagram of circuits and apparatus illustrating one embodiment of this invention.

Referring now to the drawings and FIG. 1 in particular, a circuit is shown that will apply initial excitation voltage to the field winding of a self-excited dynamoelectric machine. FIG. 1 shows a dynamoelectric machine or, more specifically, an alternating current generator 12 having an armature 14 and a field winding 16. The generator 12 is disposed to supply electrical energy to line conductors 18, 20 and 22 through generator output terminals 24, 26 and 28, respectively. The alternating current generator 12 is self-excited, receiving the electrical energy for field winding 16 from its own output terminals 24, 26 and 28. More specifically, a voltage proportional to the generator output voltage is obtained by connections 30 and 32 to generator line conductors 20 and 22, transformed in power potential transformer 34 and applied to terminals 36 and 38 of regulating circuits 40. The regulating circuits 40 produce a field excitation voltage at terminals 42 and 44, and this voltage is applied to field winding 16 at terminals 46 and 48. The field voltage produced by regulating circuits 40 maintains the output voltage of the alternating current generator 12 at a predetermined value. Any one of several regulating circuits would be suitable for applying the proper excitation voltage to field winding 16. For example, the regulating circuitry described in copending application Serial No. 236,520, filed November 9, 1962, by P. O. Bobo et al., and assigned to the same assignee as the present application would be suitable.

In order to supply initial excitation current to field winding 16 and enable the generator 12 to produce a voltage, a battery 50 is connected in series circuit relation with field winding 16. An independent source of rectified alternating current voltage would also be suitable. To connect the battery 50 to field winding 16, a breaker 52 having contacts 54 and 56 is provided.

The coordination between the application of the initial excitation voltage to field winding 16 and its removal when the generator output voltage has reached a certain magnitude, is accomplished by utilizing the switching characteristics of semiconductor controlled rectifier 60. A semi-conductor controlled rectifier is a three terminal device having an anode A, cathode C, and control electrode or gate G. In the reverse or non-conducting direction, the device exhibits the low leakage characteristics of a semiconductor rectifier. In the forward or conducting direction, conduction of current through the anode-cathode path of the controlled rectifier may be initiated by the application of a control pulse to the gate G. If a gate signal is not applied, the device will not conduct below rated forward blocking voltage. With the application of a gate signal, however, the device switches rapidly to a conducting state and the gate G no longer has control. In order to stop conduction once it has been initiated, the anode-cathode current must be reduced to a very small value, below a current called the holding current of the controlled rectifier. A semiconductor controlled rectifier is very similar in operation to a gas thyratron, both requiring a positive to negative anode to cathode, and a positive triggering signal applied to the gate G to initiate firing or conduction of the device.

More specifically, the semiconductor controlled rectifier 60 is connected with its anode-cathode path in series circuit relation with the unidirectional voltage source or battery 50 and field winding 16. The anode A of controlled rectifier 60 is connected to the positive terminal of battery 50 and its cathode C is connected to field winding 16 at terminal 46. The gate circuit of the controlled rectifier 60 comprises a capacitor 62 and resistor 64 serially connected from the gate electrode G to terminal 66 located between the positive terminal of battery 50 and the anode A of controlled rectifier 60.

In operation, breaker 52 is actuated, closing its contacts 54 and 56, completing the series circuit comprising the unidirectional voltage source 50, semiconductor rectifier 60 and field winding 16. Breaker 52 may be closed when a prime mover starts to rotate the generator 12, or the breaker 52 may be closed after generator 12 has been broughet up to rated speed. Upon closing of the breaker 52, capacitor 62 will charge, causing a charging current to flow through resistor 64, gate G and cathode C of controlled rectifier 60, and field winding 16. This charging current is a sufficient gate signal to cause controlled rectifier 60 to become conductive through its anode-cathode circuit. When controlled rectifier 60 becomes conductive, the battery 50 is effectively connected to the field winding 16 and supplies the necessary excitation voltage to field winding 16 to enable the output voltage of generator 12 to build up. As the voltage output from generator 12 increases, the regulator circuits 40 apply an increasing voltage to field winding 16. When the peak output voltage from regulator circuits 40 exceeds the voltage of unidirectional voltage source 50, the cathode C of controlled rectifier 60 becomes more positive than the anode A, dropping the current through the anode-cathode circuit of controlled rectifier 60 to zero and causing controlled rectifier 60 to again become non-conductive. Controlled rectifier 60 thus acts as an open switch, effectively disconnecting the unidirectional voltage source 50 from the field winding 16, thus allowing the total field excitation voltage to be obtained from regulator circuits 40.

Figure 2:
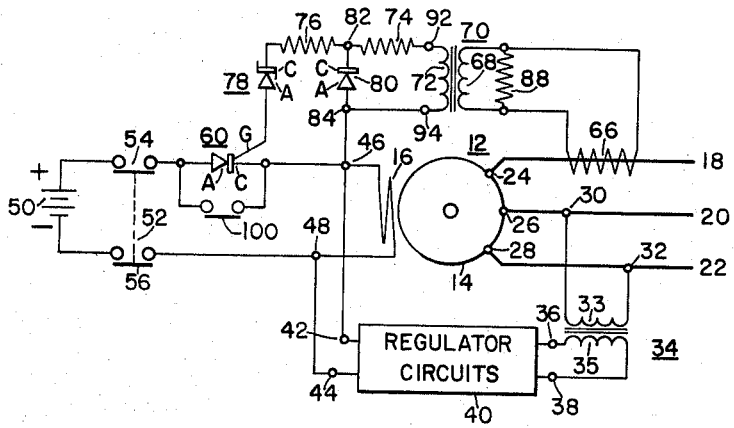
FIG. 2 is a schematic diagram of circuits and apparatus illustrating another embodiment of this invention.

Referring now to FIG. 2, a circuit is shown that will provide excitation current to a field winding of a dynamoelectric machine in the event the output of the machine is short circuited. More specifically, a dynamoelectric machine is shown similar to the one shown in FIG. 1, and like reference numerals in FIG. 2 refer to like components of FIG. 1.

Dynamoelectric machine or alternating current generator 12 is comprised of an armature 14, field winding 16, and is disposed to supply electrical energy to line conductors 18, 20 and 22 from generator terminals 24, 26 and 28. The field circuit comprises unidirectional voltage source 50 for field flashing purposes, semiconductor controlled rectifier 60 and field winding 16. Semiconductor controlled rectifier 60 is comprised of an anode A and cathode C connected in the hereinbefore described series circuit reflection, and a control electrode or gate G. The regulator circuits 40 obtain a signal responsive to the generator output voltage by virtue of power potential transformer 34 having winding 33 connected, in this instance, to generator line conductors 20 and 22 at terminals 30 and 32, and winding 35 connected to terminals 36 and 38 on regulator circuit 40. The excitation voltage produced by regulating circuits 40 at its output terminals 42 and 44 is applied to field winding 16 at terminals 46 and 48.

To obtain a voltage proportional to the line current of the generator 12, a current transformer 66 is disposed in an inductive relationship with, in this instance, generator line conductor 18. Current transformer 66 is connected to winding 68 of transformer 70, and a resistor 88 is connected across winding 68. Transformer 70 transform the voltage developed across resistor 88 into a usable range of magnitudes. Winding 72 of transformer 70 is connected in series circuit relation with resistors 74 and 76, semiconductor diode 78, which is preferably a Zener diode having an anode A and cathode C, and the gate-cathode circuit of semiconductor controlled rectifier 60. A Zener diode is a silicon junction device which allows current conduction in its forward direction and will also allow current conduction in its reverse direction when a predetermined breakdown or Zener voltage is reached. More specifically, winding 72 of transformer 70 has terminal 92 connected to resistor 74, and resistor 74 has one side connected to resistor 76 at junction 82. The remaining side of resistor 76 is connected to the cathode C of Zener diode 78, and the anode A of Zener diode 78 is connected to the gate G of controlled rectifier 60. The cathode C of controlled rectifier 60 is connected to junction 46, and junction 46 is connected to terminal 94 of transformer winding 72 through junction 84. A rectifier 80, which may be a semiconductor diode comprising an anode A and cathode C, is connected from junction 82 to junction 84, with its cathode C being connected to junction 82 and its anode A being connected to junction 84.

In operation of the circuit shown in FIG. 2, when the output of generator 12 is short circuited, the voltage output at terminals 24, 26 and 28 falls to zero and the voltage output from regulating circuits 40 falls to zero. In order to maintain excitation of the alternating current generator 12 until all protective relays are energized and the necessary circuit breakers operated to disconnect the alternating current generator from the short circuit, a voltage proportional to generator line current is obtained by virtue of current transformer 66 and transformed to a usable voltage in transformer 70. During the one half cycle when the end of winding 72 represented by terminal 94 is positive, rectifier 80 conducts and the voltage from winding 72 appears across resistor 74. During the next half cycle, when end 92 of winding 72 is positive, rectifier 80 blocks current flow and the voltage will appear across resistors 74 and 76 and Zener diode 78. When the voltage produced by transformer 70 at winding 72 is less than the reverse breakdown voltage of Zener diode 78, no current will flow, as the Zener diode will effectively block current flow in its reverse direction until its avalanche or breakdown voltage is exceeded. When the current through line conductor 18 assumes short circuit magnitudes, a voltage exceeding the reverse breakdown voltage of the Zener diode 78 is produced by current transformer 66 and transformer 70, and applied to Zener diode 78, causing a current to flow through the cathode-anode circuit of Zener diode 78, gate electrode G and cathode C of controlled rectifier 60, to terminal 46 and back to winding 72 at terminal 94. This current flow through the gate-cathode circuit of the controlled rectifier 60 causes controlled rectifier 60 to become conductive, thus connecting the unidirectional voltage source 50 to the field winding 16 and supplying excitation during the short circuit. This allows time for protective relays and breakers to operate as hereinbefore mentioned.

Figure 3:
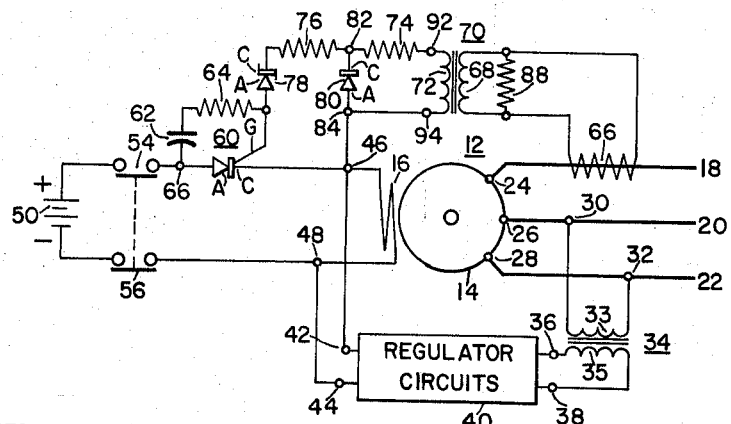
FIG. 3 is a schematic diagram of circuits and apparatus illustrating still another embodiment of the invention.

In FIG. 2, field flashing or initial excitation of the field winding 16 of alternating current generator 12 may be accomplished by closing breaker 54 and the contact 100, by-passing the nonconducting controlled rectifier 60, and then opening contact 100 after the generator output voltage has built up. This method or field flashing is not inherently coordinated and automatic and would require a device such as a timer to automatically open contact 100 at a predetermined time. A simple and inexpensive way to automatically coordinate the filed flashing or initial excitation of the field winding 16 would be to combine the circuit of FIG. 1 with the short circuit excitation circuit of FIG. 2. This has an additional advantage in that the same semiconductor controlled rectifier may be used to provide both functions. Therefore, to add an automatic and coordinated initial excitation system to the short circuit excitation system shown in FIG. 2 requires only the addition of a resistor and capacitor. FIG. 3 illustrates the initial excitation system and short circuit excitation system combined in one complete system. FIG. 3 is similar to FIG. 2 except for the addition of capacitor 62 and resistor 64, and the removal of contact 100. Like reference numerals in FIG. 3 refer to like components in FIGS. 1 and 2.

In FIG. 3 an alternatiing current generator 12 is comprised of a field winding 16 and armature 14, and is disposed to supply electrical energy to line conductors 18, 20 and 22 from generator output terminals 24, 26 and 28, respectively. The generator 12 is self excited and receives its excitation and voltage regulation from regulating circuits 40. Regulating circuits 40 receive a signal responsive to the output voltage of the alternating current generator 12 by virtue of transformer 34. Transformer 34 has winding 33 connected to generator line conductors 20 and 22 at connections 30 and 32. Winding 35 of transformer 34 is connected to regulating circuits 40 at input terminals 36 and 38. The output terminals 42 and 44 of regulating circuits 40 are connected to the field winding 16 at connections 46 and 48.

The field circuit is a series circuit comprising a unidirectional voltage source 50, which in this instance, will be used to provide both initial and short circuit excitation to the field winding 16, a semiconductor controlled rectifier 60 having an anode A, and cathode C in the series circuit and a gate electrode G, and the field winding 16.

Breaker 52, having contacts 54 and 56 in the series field circuit, is used when it is desired to physically disconnect the unidirectional power supply 50 from the field circuit.

In order to provide a signal to the gate electrode G of controlled rectifier 60 and hence initial excitation to the field winding 16, resistor 64 and capacitor 62 are connected serially from the gate electrode G of controlled rectifier 60 to junction 66 between the positive terminal of the unidirectional power supply and the anode A of controlled rectifier 60.

In order to provide a signal to the gate electrode G of controlled rectifier 60 and, therefore, provide short circuit excitation to the field winding 16, transformer 70 is, in his instance, connected between the generator line conductor 18 and the gate electrode G of controlled rectifier 60. Winding 68 of transformer 70 is connected to current transformer 66, which is disposed in an inductive relationship with line conductor 18 and produces a voltage proportional to the generator line current. Terminal 92 of winding 72 of transformer 70 is serially connected with resistors 74 and 76 and Zener diode 78, to the gate electrode G of controlled rectifier 60. The series circuit is completed through the gate-cathode circuit of controlled rectifier 60 to terminal 46 and back to winding 72 at terminal 94. The rectifier 80, which may be a semiconductor diode comprising an anode A and a cathode C is connected from terminal 82 between resistors 74 and 76 to terminal 84.

In the operation of the combined initial excitation and short circuit excitation circuits, controlled rectifier 60 is utilized in both functions. More specifically, the prime mover is started that rotates generator 12, or when generator 12 is up to speed, breaker 52 is closed, closing contacts 54 and 56 and conecting the unidirectional voltage soure 50 to the hereinbefore mentioned series circuit. At this time, controlled rectifier 60 is in its nonconducting state. However, capacitor 62 starts to charge and the charging current through resistor 64, gate electrode G and cathode C of controlled rectifier 60, and field winding 16 is sufficient gate signal to cause controlled rectifier 60 to become conducting and thus connect unidirectional voltage source 50 with the field winding 16. Resistor 74 has sufficient magitude to prevent the charging current of capacitor 62 to by-pass the gate-cathode circuit of controlled rectifier 60. Voltage source 50, therefore, supplies excitation current to winding 16 of alternating current generator 12, allowing the generator 12 to build up its output voltage. As soon as the generator output voltage reaches a point where the output of regulating circuits 40 applies a greater voltage to the field winding 16 than the series source voltage 50, the cathode C of controlled rectifier 60 becomes more positive than the anode A, and the current through the anode-cathode circuit falls to zero, and controlled rectifier 60 will no longer conduct current. Controlled rectifier 60 thus isolates voltage source 50 from the field winding 16 nd the compleete xcitation requirments of generator 12 are provided by the regulating circuits 40.

In the event the output of generator 12 becomes short circuited, dropping the generator output voltage and the output of regulating circuits 40 to zero, the excitation of the alternating current generator also falls to zero. However, in order to energize protective relays and operate the necessary circuit breakers to disconnect the alternating current generator from the short circuit, it is necessary to maintain the excitation of the alternating current generator after the occurrence of the short circuit. This is accomplished by using the same controlled rertifier 60 to connect the same voltage source 50 to the field winding 16 that was used in the initial excitation system previously described. More specifically, current transformer 66 develops a voltage across resistor 88 proportional to line current, and this voltage is applied to winding 68 of transformer 70. Transformer 70 transforms the voltage applied to winding 68 to a voltage in a usable range in winding 72. Swing the one-half cycle of voltage produced by winding 72 that is positive at terminal 94, rectifier 80 conducts and the voltage produced in winding 72 will appear across resistor 74. During the next one half cycle, when terminal 92 is positive, rectifier 80 blocks current flow and the voltage from winding 72 will appear across resistors 74 and 76, and Zener diode 78. Under normal circuit conditions, the peak voltage produced in winding 72 is less than the reverse breakdown voltage of Zener diode 78, and no current will flow. When the current in line conductor 18 reaches short circuit magnitudes, however, a voltage is produced in winding 72 of transformer 70 that will exceed the breakdown voltage of Zener diode 78, causing a current to flow through the Zener diode, through the gate-cathode path of controlled rectifier 60, and back to winding 72. This current through the gate-cathode circuit of controlled rectifier 60 causes the anode-cathode circuit to become conductive, thus connecting the unidirectional voltage source 50 with the field winding 16 and supplying the necessary excitation voltage to said field winding.

It will, therefore, be apparent that there has been disclosed an initial excitation system that uses all static components and that is completely automatic in operation. The system is completely in coordination with the alternating current generator and the unidirectional voltage source is removed from the field circuit at the proper time.

It is also apparent there has been disclosed a system using static components that will automatically provide excitation to the field winding of an alternating current generator in the event of a short circuit. It should be noted that the initial excitaion system and the short circuit excitation system may be easily combined in the control of an alternating current generator, with the same semiconductor controlled rectifier being used in the performance of both functions.

Since numerous changes may be made in the above described apparatus and the different embodiments of the invention may be made without departing from the spirit thereof, it is intended that all matter contained in the foregoing description or shown in the accompanying drawings shall be interpreted as illustrative, and not in a limiting sense.

We claim as our invention:

1. An excitation system for a self-excited dynamoelectric machine having a field winding and output terminals disposed to supply electrical current to load conductors, comprising first means applying a potential to said field winding when said dynamoelectric machine is producing a potential at its output terminals, second means comprising semiconductor switching means having main electrodes and a control electrode, third means providing a source of potential, said third means and the main electrodes of said second means being connected in series circuit relation with said field winding, fourth means applying a first signal to the control electrode of said second means when said dynamoelectric machine is started, said first signal switching said second means to a conductive state to connect said third means with said field winding and allow current to flow from said third means through said field winding and enable said self-excited dynamoelectric machine to produce an output potential, said semiconductor switching means switching from the conductive state to a non-conductive state to reduce the current flow from said third means to zero when the potential from said first means exceeds the potential of said third means, fifth means applying a second signal to the control electrodes of said second means when the current in the load conductor reaches a predetermined short circuit magnitude, said second signal switching said second means back to the conductive state to again connect said third means with said field winding and allow current to flow from said third means through said field winding.

2. An excitation system for a self-excited dynamoelectric machine having a field winding and output terminals disposed to supply electric current to load conductors, comprising excitation means connected in circuit relation with said output terminals and said field winding for applying a potential to said field winding when said dynamoelectric machine is producing a potential at its output terminals, a source of unidirectional potential, semiconductor means having main electrodes, a control electrode, and non-conductive and conductive states, switching means for selectively opening and closing an electric circuit, said source of unidirectional potential, the main electrodes of said semiconductor means, and said switching means being connected serially with said field winding, means connected in circuit relation with one of the main electrodes and the control electrode of said semiconductor means for applying a first signal to the control electrode when said switching means is closed, said first signal changing said semiconductor means from a non-conductive state to a conductive state to allow current to flow from said source of unidirectional potential through said field winding and cause said dynamoelectric machine to produce a potential at its output terminals, said semiconductor means reverting to a non-conductive state to reduce the current flow from said source of unidirectional potential to zero when said excitation means applies an excitation potential to said field winding that exceeds the magnitude of said source of unidirectional potential, means responsive to the current flowing in the load conductors connected in circuit relation with the control electrode of said semi-conductor means, said current responsive means applying a second signal to said control electrode when the current in the load conductor reaches a predetermined short circuit magnitude, said second signal changing said semiconductor means from a non-conductive state to a conductive state to allow current to again flow from said source of potential through said field winding.

3. An excitation system for a self-excited dynamoelectric machine having a field winding, output terminals, and excitation means for applying an excitation potential to the field winding when the dynamoelectric machine is producing a potential at its output terminals, comprising a source of unidirectional potential, semiconductor means having main electrodes, a control electrode, and having conductive and non-conductive states, said source of unidirectional potential and the main electrodes of said semiconductor means being connected in series circuit relation with said field winding, means connected in circuit relation with one of the main electrodes and the control electrode of said semiconductor means for applying a signal to the control electrode when said dynamoelectric machine is started, said signal changing said semiconductor means from a non-conductive state to a conductive state to allow current to flow from said source of unidirectional potential through said field winding, said semiconductor means reverting to a non-conductive state to reduce the current flow from said source of unidirectional potential to zero when the excitation means applies an excitation potential to said field winding that exceeds the magnitude of said source of potential.

4. An excitation system for a dynamoelectric machine having a field winding and output terminals, comprising excitation means connected in circuit relation with said output terminals and said field winding for applying a potential to said field winding when the dynamoelectric machine is producing a potential at its output terminals, a source of unidirectional potential, a controlled rectifier having main electrodes and a control electrode, switching means for selectively opening and closing an electric circuit, said source of unidirectional potential, the main electrodes of said controlled rectifier, and said switching means being connected serially with said field winding, means connected in circuit relation with one of the main electrodes and the control electrode of said controlled rectifiers for applying a signal to the control electrode when said switching means is closed, said signal changing said controlled rectifier from a non-conductive state to a conductive state to allow current to flow from said source of unidirectional potential through said field winding and cause said dynamoelectric machine to produce an output potential, said controlled rectifier reverting to a non-conductive state to reduce the current flow from said source of potential to substantially zero when the excitation means applies a potential to said field winding that exceeds the magnitude of said source of potential.

5. An excitation system for a self-excited dynamoelectric machine having a field winding, output terminals for supplying electrical current to load conductors, and excitation means for applying an excitation potential to the field winding when the dynamoelectric machine is producing a potential at its output terminals, comprising a source of unidirectional potential, semiconductor means having main electrodes and a control electrode, and having conductive and non-conductive states, said source of unidirectional potential and the main electrodes of said semiconductor means being connected in series circuit relation with said field winding, means responsive to the output current of said dynamoelectric machine connected in circuit relation with said control electrode, said current responsive means applying a signal to said control electrode when the output current of said dynamoelectric machine reaches a predetermined magnitude, said signal changing said semiconductor means from a non-conductive state to a conductive state to allow current to flow from said source of unidirectional potential through said field winding.

6. An excitation system for a dynamoelectric machine having a field winding, and output terminals for supplying electric current to load conductors, comprising excitation means connected in circuit relation with said output terminals and said field winding for applying a potential to said field winding when the dynamoelectric machine is producing a potential at its output terminals, a source of unidirectional potential, a controlled rectifier having main electrodes, a control electrode, and having conductive and non-conductive states, said source of unidirectional potential and the main electrodes of said controlled rectifier being connected in series circuit relation with said field winding, means responsive to the output current of said dynamoelectric machine connected in circuit relation with the control electrodes, said current responsive means applying a signal to said control electrode when the output current of said dynamoelectric machine reaches a predetermined magnitude, said signal changing said controlled rectifier from a non-conductive to a conductive state to allow current to flow from said source of unidirectional potential through said field winding.

References Cited by the Examiner
UNITED STATES PATENTS

| Re. 22,154 | 8/1942 | Mandl | 322—60 |
| 2,896,149 | 7/1959 | Lowry et al. | 322—28 |
| 3,009,091 | 11/1961 | Hallidy | 322—28 |

ORIS L. RADER, *Primary Examiner.*

LLOYD McCOLLUM, *Examiner.*

J. J. SWARTZ, A. H. TISCHER, *Assistant Examiners.*